United States Patent

[11] 3,583,281

| [72] | Inventors | Morris R. Hicks<br>Brook Park;<br>Joseph C. LeVeque, Cleveland, both of, Ohio |
|---|---|---|
| [21] | Appl. No. | 822,237 |
| [22] | Filed | May 6, 1969 |
| [45] | Patented | June 8, 1971 |
| [73] | Assignee | Bardons & Oliver, Inc.<br>Cleveland, Ohio<br>Continuation-in-part of application Ser. No. 652,127, July 10, 1967, now Patent No. 3,447,220. |

[54] PROGRAMMABLE FLUIDIC CONTROL SYSTEM FOR MACHINE TOOLS
10 Claims, 17 Drawing Figs.

[52] U.S. Cl. .................................................. 90/13,
 60/97, 91/37
[51] Int. Cl. ................................................. B23c 1/00,
 F15b 21/02
[50] Field of Search ........................................ 90/13, 13.5,
 13.99, 11; 77/32.1; 91/37, 411; 60/97 T

[56] References Cited
UNITED STATES PATENTS
| 3,174,406 | 3/1965 | Hague et al. ................. | 77/32.2UX |
| 3,282,049 | 11/1966 | Benton ........................ | 90/13.99UX |

*Primary Examiner*—Gil Weidenfeld
*Attorney*—Bosworth, Sessions, Herrstrom & Cain

ABSTRACT: A machine tool, such as a milling machine, embodying a control system employing fluid amplifiers for controlling and actuating in selected sequence a plurality of steps in an automatic cycle of the machine. Means are provided whereby the selective programming of the cycle may be set up at a central control console conveniently located for the operator, and sequentially executed by operation of relatively high fluid pressure in response to relatively low-pressure fluidic signals. The low-pressure fluidic signals, as on the order of about 1 p.s.i. or less, are selectively employed to control flow of relatively high-pressure fluid to cause the relatively high-pressure fluid to actuate power means such as hydraulic cylinders for causing programmed relative movements of work holding and toolholding means of the machine.

3,583,281

PROGRAMMABLE FLUIDIC CONTROL SYSTEM FOR MACHINE TOOLS

CROSS-REFERENCE TO RELATED APPLICATION

This application is a continuation-in-part of applicants' U.S. application Ser. No. 652,127 filed July 10, 1967 now U.S. Pat. No. 3,447,220.

This invention relates to apparatus such as machine tools embodying fluidic control systems employing fluid amplifiers for controlling and actuating the apparatus according to desired programs.

BACKGROUND OF THE INVENTION

Prior machine tools, such as milling machines, employing means for causing relative movements between a toolholder and a work holder in which the relative movements may be at different speeds and directions, and in which such relative movements are programmed or automatically controlled by electrical or liquid powered means, often have been subject to interrupted operations and consequent time loss, have been complicated and costly in design, construction, maintenance and operation, and for the most part have not been readily accessible for repair or maintenance.

SUMMARY OF THE INVENTION

The present invention relates to programmable machine tools employing low-pressure fluid signal means to control or actuate relatively substantially higher pressure fluid circuits including fluid amplifiers, automatically to carry out a program of one or more preselected operations or functions to be effected by the machine, in preselected sequences, in response to programming set up at a console. The invention includes, among other things, fluid amplifiers (TA) operating at very low pressures such as about one-thirty p.s.i. to 1¼ p.s.i., to control fluid pressure circuits operating at substantially higher pressures as in the range of about 60—150 p.s.i. and including fluid amplifier (PV) devices that control fluid power means to cause the desired movements of machine parts at the proper times and sequences in carrying out the preselected operations. Such low-pressure fluid amplifiers preferably are controlled by manually set machine function selector valve switches (FS) which may be of conventional types, by indexible selector valve means (SV), and by limit valves (LV) which may be of conventional types operated by various powered members of the machine.

This organization of means in pneumatic circuitry makes possible advantageous and important savings in initial construction costs and in maintenance and operational costs and time. The use of fluidic circuits increases dependability of operation because of fewer moving parts, elimination of electrical circuit elements that can corrode, stick, or short circuit, and the reduction of liquid filled parts that can leak. Furthermore, the flexibility of the machine in the selection of functions to be performed and in carrying them out effectively is materially increased over prior machines which have depended entirely upon electrical or hydraulic energizers in their control systems.

The primary object of the invention is to provide programmable fluidic control systems of the type summarized above having the advantages indicated above.

BRIEF DESCRIPTION OF DRAWINGS

The features and advantages of the invention will become apparent from the following description of a preferred embodiment in connection with the accompanying drawings in which.

DESCRIPTION OF PREFERRED EMBODIMENT

General Arrangement

The apparatus illustrated as embodying the invention comprises a milling machine A connected to a remote control console C, that is preferably a unit in itself but has operative communication to the machine by conduit means B containing fluid tubes for carrying pneumatic signals in accordance with a program set up on the console, together with electric wires if desired for controlling electric motors used for rotating the toolholder and pressurizing hydraulic fluid.

Figure 1:
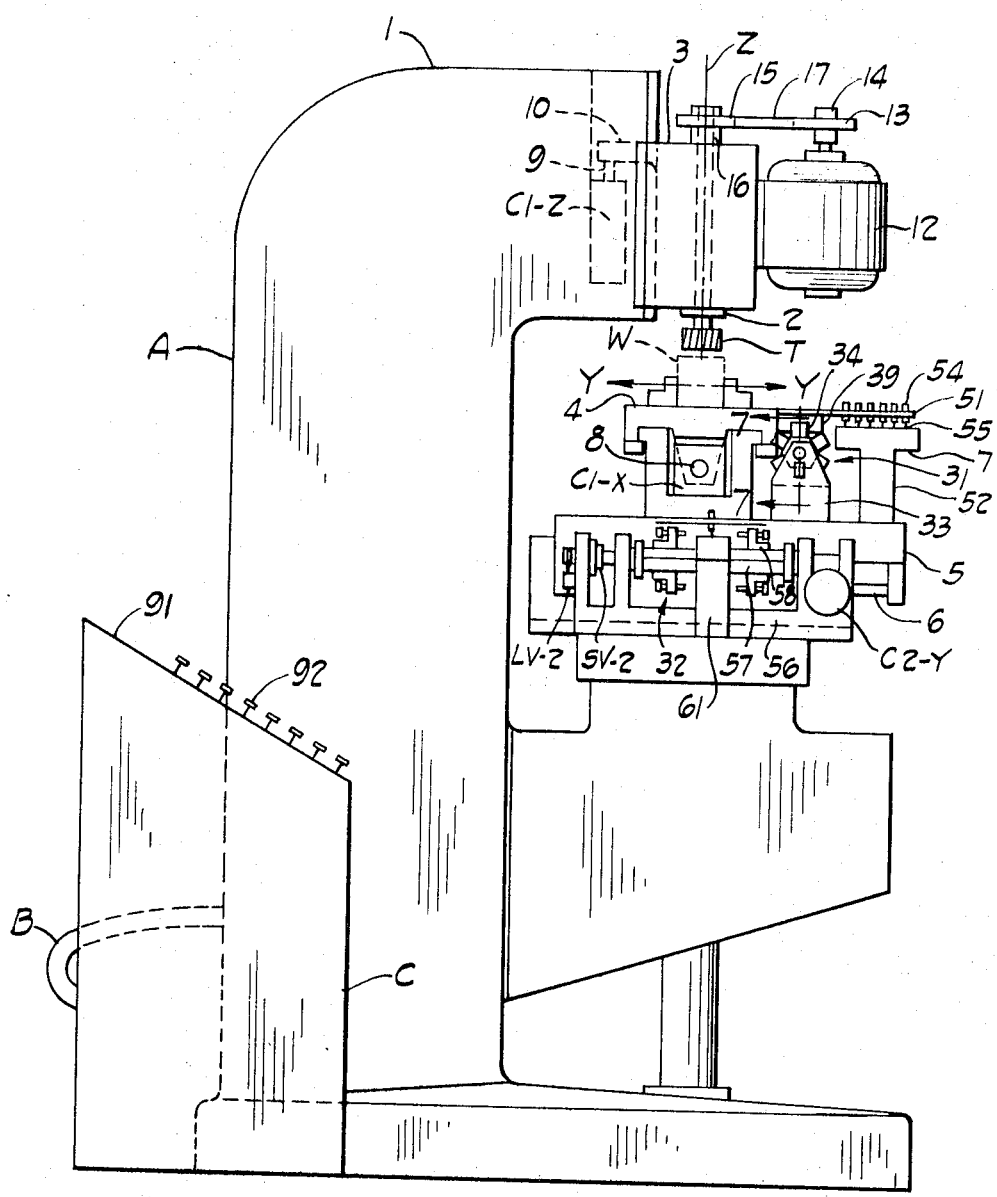
FIG. 1 is a side elevation of a milling machine embodying the invention.
Figure 2:
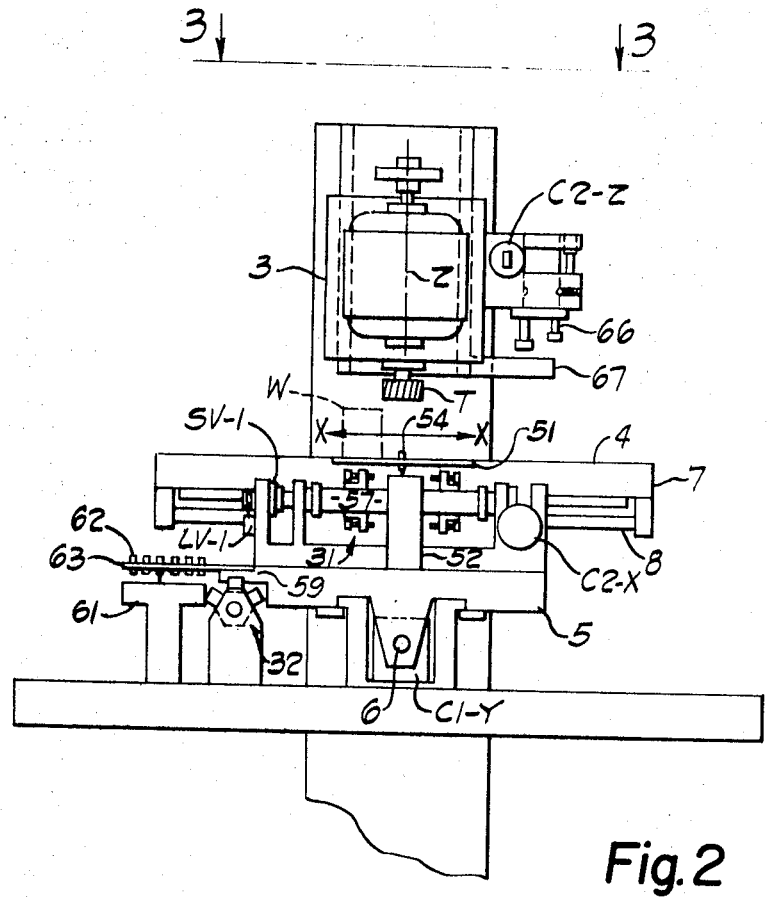
FIG. 2 is a front elevation of the machine of FIG. 1 and to the same scale.

The illustrated milling machine is a vertical type of machine comprising a conventional base 1, a rotatable toolholder or spindle 2 adapted to carry a cutting tool T mounted on a carriage 3 that is vertically movable on the base, and a work holder taking the form of worktable 4, to which work W may be clamped by suitable conventional means horizontally movable on the base. The work table is movable by power parallel to two horizontal axes: one axis indicated as X, parallel to the front face of the machine and shown by the arrow in FIG. 2; and the other axis indicated as Y, at right angles to axis X and shown by the arrow in FIG. 1. Both these axes are at right angles to a vertical axis Z along which the spindle 2 is moved.

Work table 4 is supported from base 1 and power actuated as follows. A first carriage 5 is slidably mounted on the base in a conventional manner for movement in a fixed path parallel to the Y axis and is positively moved as required by hydraulic cylinder C1-Y secured to the base 1 and having a piston rod 6 that is fixed to the carriage 5. A second carriage 7, to which is fixed work table 4, is slidably mounted in a conventional manner for movement parallel to the X axis in a fixed path on carriage 5. This second carriage is positively moved as required by hydraulic cylinder c1-X secured to first carriage 5 and having a piston rod 8 connected to second carriage 7.

The carriage 3 carrying spindle 2 is a third carriage and is slidably mounted in a conventional manner on base 1, for movement in a fixed path along the vertical Z axis, and is positively moved vertically as required by a hydraulic cylinder C1-Z secured to base 1 and having a piston rod 9 fixed to an arm 10 on carriage 3. Spindle 2 is rotated as required by an electric motor 12 through pulley 13 on motor shaft 14, a pulley 15 on spindle shaft 16, and a belt 17 engaging these pulleys.

Hydraulic cylinders C1-X, C1-Y, and C1-Z are powered by hydraulic fluid from reservoir 18 (FIG. 13c) passing through hydraulic line 19 under pressure generated by conventional pump 22 driven by electric motor 23, the fluid returning through line 20 to the reservoir.

The workpiece W is moved by the worktable 4 parallel to either or both the X or Y axes to pass in operational contact with the tool T. According to the present invention, variable rates of movement of the workpiece along both axes are possible, and the tool may be moved into and out of operational contact with the workpiece.

Machine function selectors are provided preferably at a console, to predetermine an automatic sequence of machine operations along the three axes of movement to suit the requirements of a large variety of work.

Moreover, as the worktable moves in each direction along each axis of its motion, its end positions are determined by adjustable positive stops and usable fluidic control signals are produced. Furthermore, at intermediate positions of the worktable as it moves along in each direction adjustable means also produce usable fluidic control signals. The positive stops are carried on multiposition indexible stop and selector valve means to be described later, while the intermediate adjustable means operate between the carriage that is to be intermediately positioned and the base or carriage slidably supporting it.

Since the relationship between the top of the worktable and the cutting surface of the tool on the spindle will vary because of the workpiece configuration and tool configuration, positioning of the tool along its Z axis of movement is adjustable, and index means are provided for more than one cutter working position.

Fluidic Components

Figure 4:
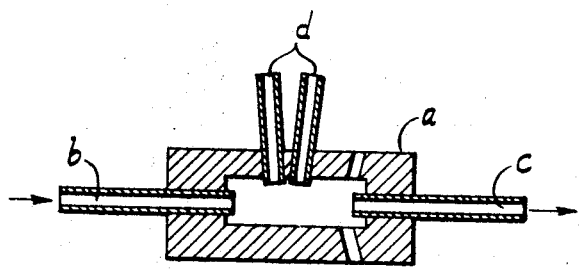
FIG. 4 is a diagrammatic view of a form of fluid amplifier (TA) used in the illustrative embodiment.

The fluid amplifiers TA used as relays in the illustrated apparatus may be of a known commercial type; a typical one is diagrammatically illustrated in FIG. 4. As shown, each comprises a vented capsule or housing $a$, having spaced apart axially aligned input and output ports $b$ and $c$ through which fluid such as air at low pressure flows in the absence of an interruption, but which fluid flow may be interrupted by impingement of a transversely directed flow of low-pressure fluid entering through one or more control ports $d$, so that output through port $c$ is reduced to zero pressure.

Figure 5:
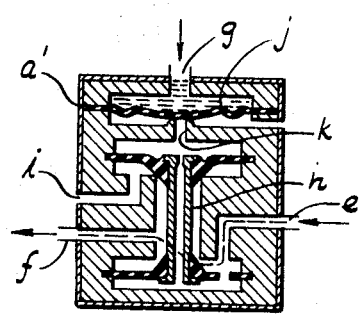
FIG. 5 is a diagrammatic view of another form of fluid amplifier (PV) used in the illustrative embodiment, this amplifier being normally closed to flow of fluid from its inlet to its outlet but actuatable by a low-pressure fluid signal to permit flow of high-pressure fluid from its inlet to its outlet.

The other type of fluid amplifiers PV utilized in the illustrative embodiment may also be designated as fluid jet amplifiers or pilot valves; a typical one of known commercial type is diagrammatically illustrated in FIG. 5. It comprises a vented capsule $a'$. Fluid such as air at a high pressure is supplied at inlet port $e$ and flows out of outlet port $f$ when such flow is permitted by a low-pressure fluid signal supplied through port $g$. A movable mechanical valve member $h$ normally prevents flow of fluid from port $e$ through port $f$, but causes it to flow out of exhaust port $i$. When a low-pressure fluid signal is supplied through control port $g$, it causes a diaphragm $j$ to move downwardly to the position shown in FIG. 5 and close an opening $k$ that causes a different distribution of fluid pressure to move member $h$ downwardly to the position shown in FIG. 5 to permit passage of fluid from inlet port $e$ out through outlet port $f$. One type of such fluid amplifier that may be used is Model 2010 of Northeast Fluidics, Inc. of Amity Road, Bethany, Conn.

Figure 6A:
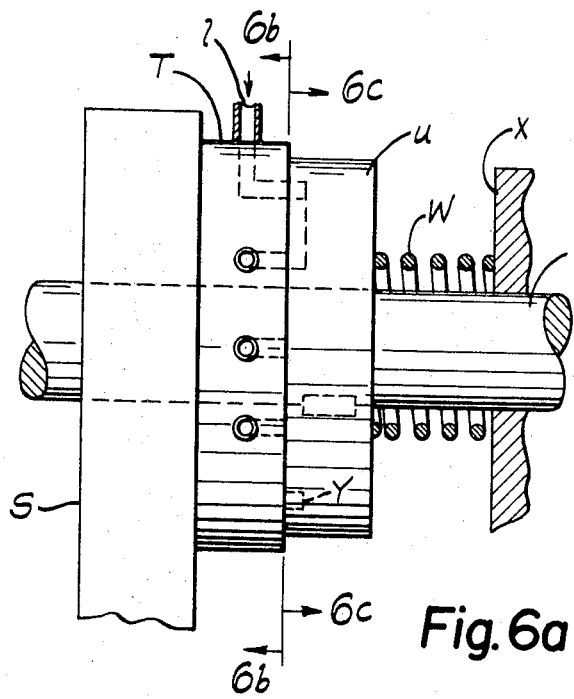
FIGS. 6a, 6b and 6c are respectively enlarged views of a selector valve, and of portions thereof from lines 6b–6b and 6c–6c of FIG. 6a, showing the arrangements of ports and movable member that make possible transmission of fluid under pressure to or from selected conduits as the rotatable portion of the valve is indexed.
Figure 6B:
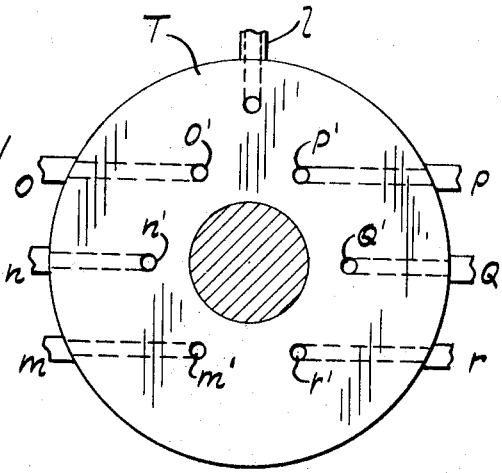
Figure 6C:
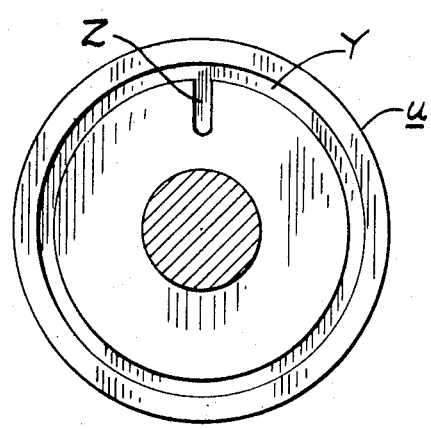

The illustrated apparatus embodies selector valves SV of which a typical one is shown in FIGS. 6a, 6b and 6c. The purpose of such a valve is to make possible a flow of fluid from or to a single port to or from a selected one of several other ports. The selector valve shown in these figures is illustrated as having a single port $l$ and six other ports $m$ to $r$ inclusive, any of which can be selected to be put in communication with port $l$. This selector valve comprises a frame member $s$ carrying a stationary valve member $t$ carrying the ports $l$ to $r$, and an adjacent rotary valve member $u$ that establishes the desired selective communication. Member $u$ is slidably keyed to a shaft $v$ that is rotatably and if desired axially slidably mounted in frame $s$. Member $u$ is held in fluidtight relation to member $t$ by a compression spring $w$ bearing against members $u$ and $x$. Rotatable member $u$ has an open annular channel $y$ on its surface facing stationary member $t$, which channel at all times communicates with port $l$. The outlet ports $m$ to $r$ inclusive respectively terminate in openings $m'$ to $r'$ located selectively to communicate with a generally radial channel $z$ in member $u$ connected to annular channel $y$. Thus, port $l$ at all times communicates with annular channel $y$ and radial channel $z$; as the rotatable member $u$ is rotatably indexed, channel $z$ moves to a position where it communicates with a particular one of the ports $m'$ to $r'$ so that the valve selectively places the single port $l$ in communication with a selected one of multiple ports $m$ to $r$.

Each of the selector valves indicated below is either identical or similar, some differing in the number of multiple ports.

Details of Fluidic Control System

In the illustrated apparatus, air is used as the fluid in both the TA and PV types of fluid devices. The air that is utilized in fluid relays TA is low-pressure air the pressure of one-thirtieth to 1¼p.s.i. and preferably essentially 1 p.s.i. and the air that is used at the control ports $g$ of the PV fluid amplifiers is at the same low pressure. The air flows through inlet and outlet ports $e$ and $f$ of the PV fluid amplifiers is high-pressure air at a substantially higher pressure of 60 to 150 p.s.i. and preferably of about 80 p.s.i., which pressure is sufficiently high so that such air can actuate conventional air-operated valves for controlling flow of liquid to hydraulic cylinders.

Figure 13A:
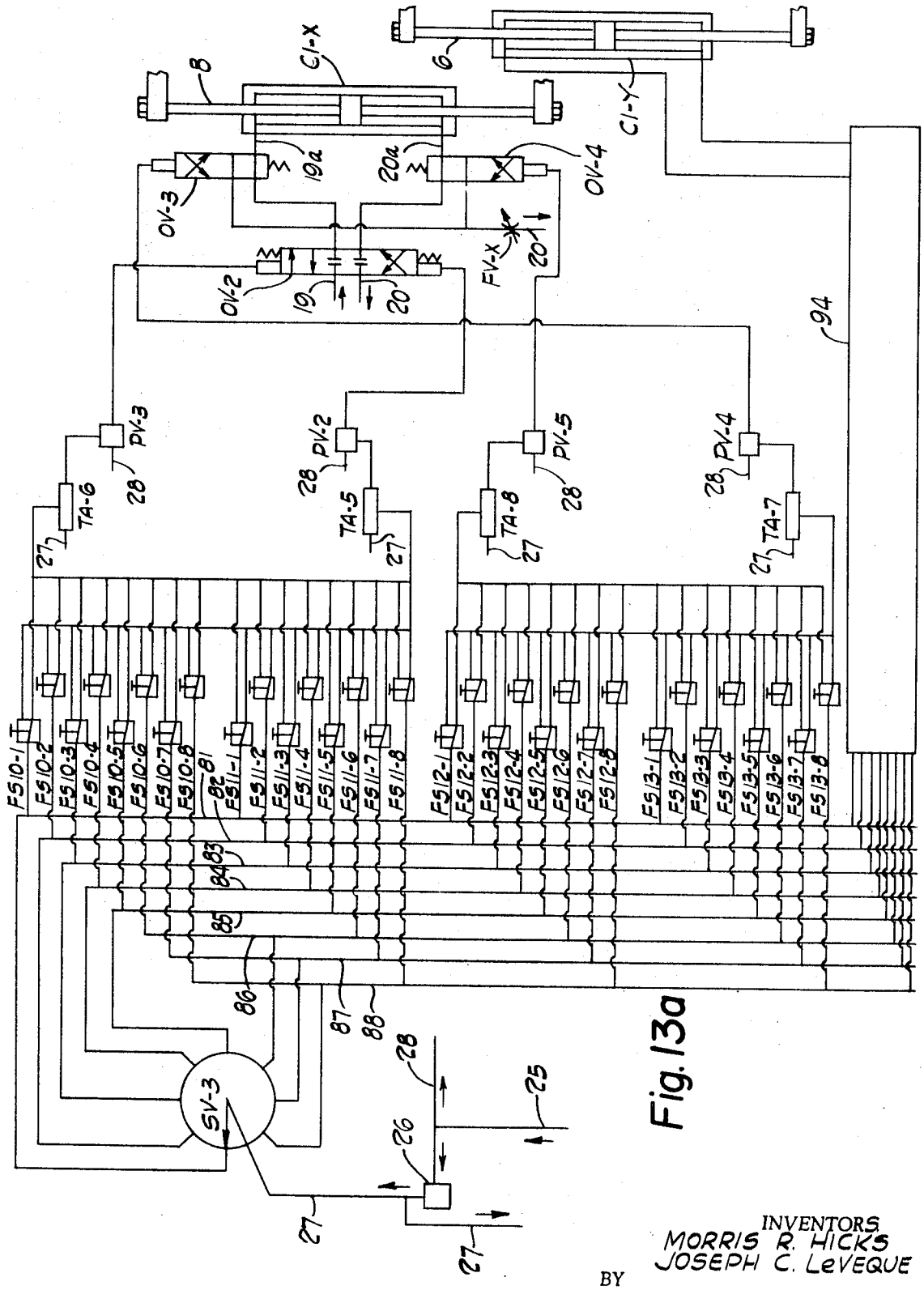
FIGS. 13a, 13b, and 13c are portions of a schematic fluid circuit diagram, illustrating the control and operating fluid circuits of the machine, as well as hydraulic power elements and elements for controlling electric motors.

As diagrammatically shown in FIG. 13a, air at the desired high pressure and of sufficient cleanliness and volume is supplied from a suitable source shown as conduit 25. A portion of this air passes through pressure regulator 26 that reduces the pressure to the desired low value.

The resulting low-pressure air is conducted through lines 27 to the inlet ports of all TA devices and of some selector valves. The high-pressure air is conducted through lines 28 to the inlet ports of all PV devices.

FIGS. 7—10 show an indexible stop and selector valve means 31 for controlling the X axis motion of the second carriage 7 carrying worktable 4, relative to the first carriage 5 mounted on the base 1 of the milling machine; an identical indexible means 32 is utilized for controlling the Y axis motion of the first carriage 5 relative to base 1, so for convenience only means 31 will be described in detail.

First carriage 5 through subframe 33 rotatably supports a shaft 34 generally parallel to the X direction of movement and indexible to six rotatable positions in the illustrated embodiment. The central portion of the shaft is hexagonal in cross section, with six equal sides 35. The sides are axially separated into segments by axially spaced grooves 36, in desired ones of which are mounted and bolted adjustable stops 37 at desired axial spacings; stops 37 include screws 38 for fine adjustment. There are two axially spaced sets of stops of six stops each in the illustrated embodiment; the stops in each set may or may not, as desired, be located in the same groove 36. For a given index position of the shaft 34, the stops are located effectively to abut an arm 39 carried by the second carriage 7 and projecting between the stops. The stops in each index position of the shaft are arranged to stop motion of the arm 39 and hence of the carriage 7 in either direction at a predetermined location for the position of the shaft.

Figure 7:
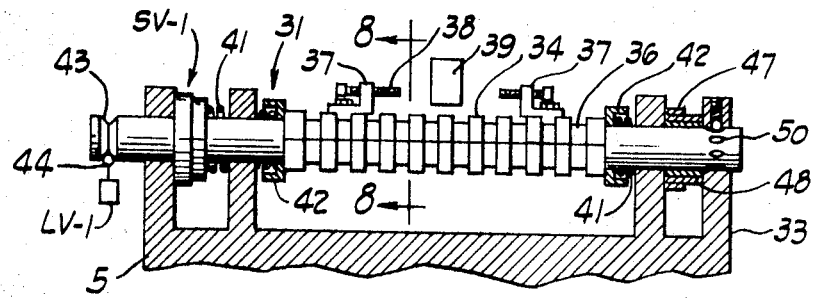
FIG. 7 is a detail view along line 7–7 of FIG. 1, but to a larger scale, of indexible stop and selector valve means for the work holding carriage that moves parallel to the X axis in the illustrated apparatus.
Figure 8:
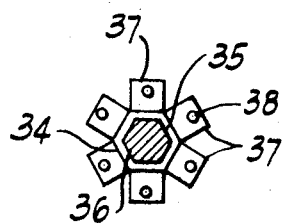
FIG. 8 is a section along line 8–8 of FIG. 7.
Figure 9:
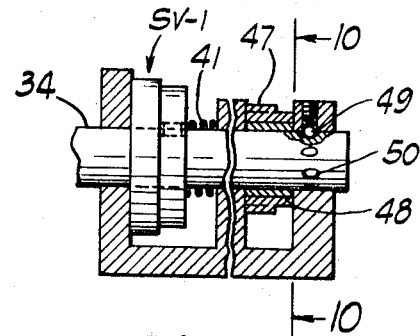
FIG. 9 is a side elevation, partly in section, illustrating power indexing means for the shaft of the mechanism of FIG. 7, parts between the indexing means and selector valve being broken away for clearness.
Figure 10:
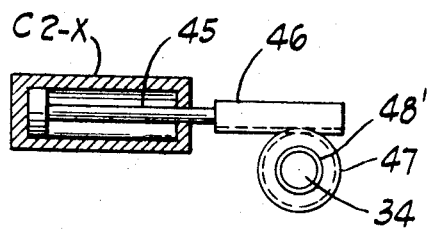
FIG. 10 is a somewhat diagrammatic view of the power indexing means generally along line 10–10 of FIG. 9.
Figure 13B:
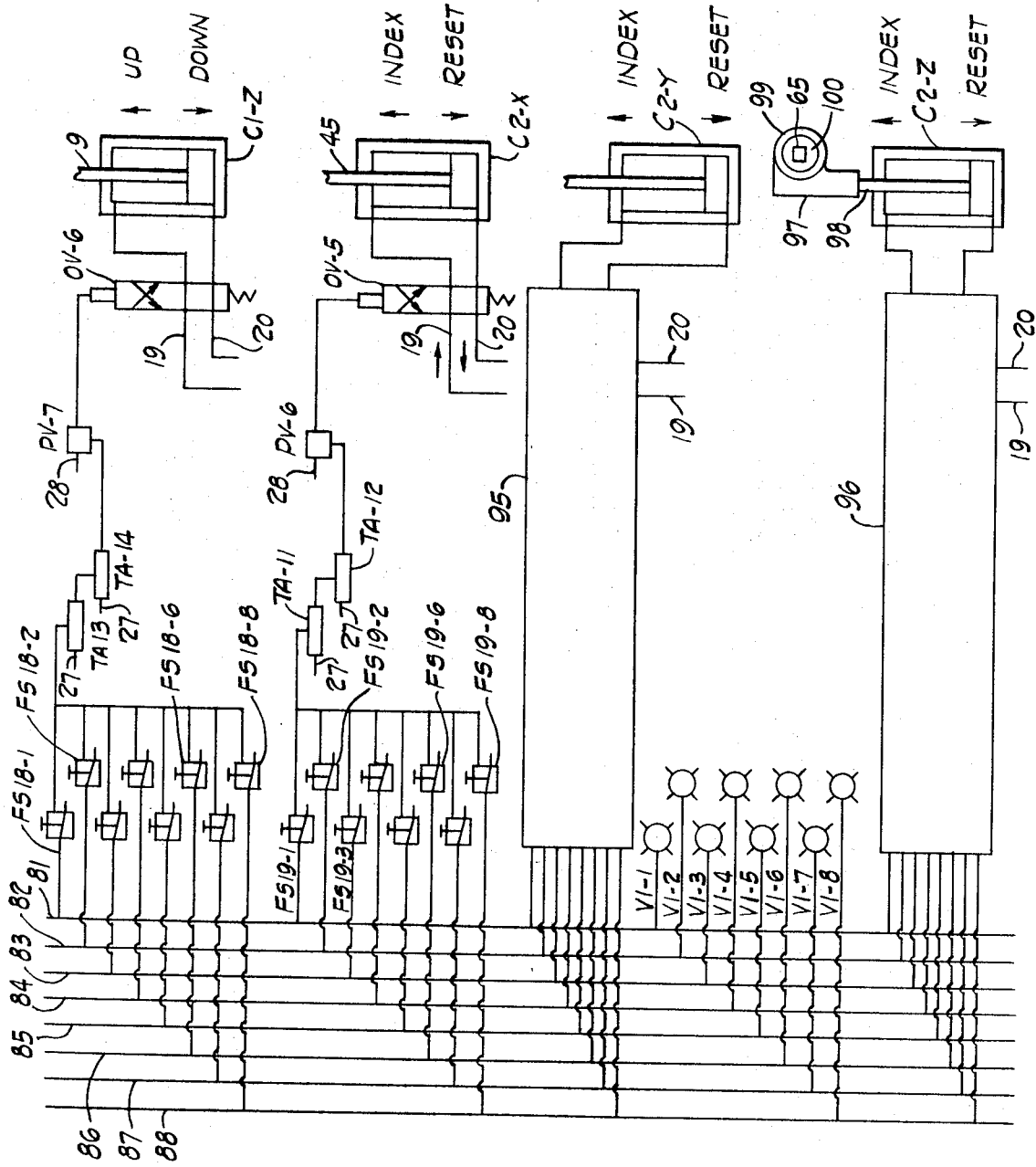
Figure 13C:
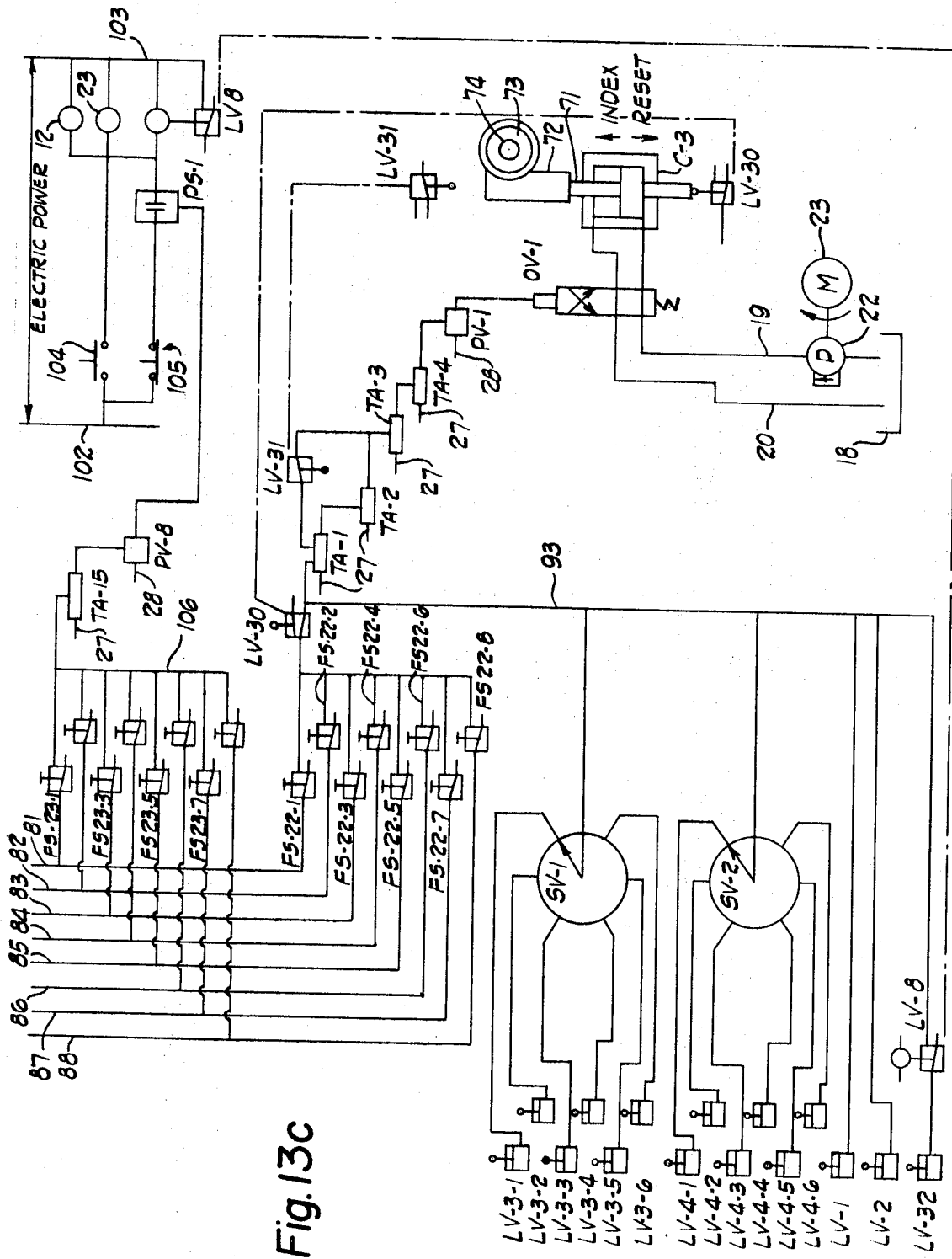

Shaft 34 moreover is mounted by means of opposed springs 41 operating between collars 42 and associated portions of the frame 33 to cause the shaft 34 to move axially on each engagement of arm 39 with a stop 37 by a distance predetermined by the distance between the associated collar 42 and the associated frame portion to a final position of the shaft in a particular axial direction of movement; the shaft also has near one end an annular groove 43 to receive the actuating member 44 of a conventional limit valve LV-1 (FIGS. 7 and 13c). Shaft 34 also carries a selector valve SV-1 that is similar to that of FIGS. 6a to 6c and has its single port adapted to be connected to the source of low-pressure air, and six outlet ports that are connected as hereinafter described. The arrangement of parts is such that when carriage 7 is moved by cylinder C1-X so its arm 39 abuts a stop screw 38, the limit valve LV-1 effectively operates prior to the stopping of the slide movement.

The shaft 34 and hence the movable part of the selector valve SV-1 is rotated into each of its six positions by a cylinder C2-X (FIGS. 2, 10, 13b) that is fixed to the first carriage and has on its piston rod 45 a toothed rack 46 that engages a pinion 47 concentrically mounted on the shaft 34. This pinion is connected to the shaft by an overrunning clutch such as a sprag clutch 48 that permits rotational drive of the pinion to the shaft when the pinion is rotated in one direction, and provides no drive when the pinion is rotated in the other direction. Travel of the piston in the cylinder C2-X is proportioned to rotate the shaft 34 one-sixth of a turn on each stroke, after which the shaft is secured against further rotation by the conventional ball and spring detent means 49 mounted on the frame 33 and engaging one of the appropriately located depressions 50 on the shaft.

Figure 11:
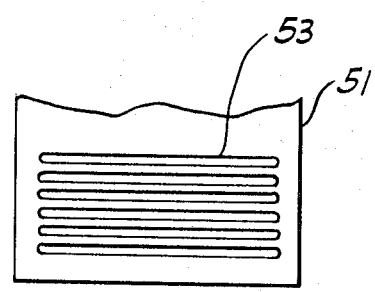
FIG. 11 is a fragmentary plan of a member for adjustably holding trip members for controlling valve operations.

The system includes means acting between the first and second carriages 5 and 7 to operate selected limit valves LV-3-1 through LV-3-6 inclusive in the lines leading to the multiple ports of the selector valve SV-1 as shown in FIG. 13c, at appropriate times during the movement of the worktable in the X direction. Such means comprises a generally horizontally projecting plate member 51 (FIGS. 1, 2, 11) overlying a portion 52 of the first carriage. Member 51 has six slots 53 extending parallel to the X axis. These slots are adapted adjustably to carry trip dogs 54 suitably located in the slots, each of which is adapted to depress the operating member 55 of an appropriate valve LV-3-1 through LV-3-6 (FIG. 13c), mounted on the upwardly extending portion 52 of first carriage 5.

Substantially identical means, except for location, are used to control the movement of the first carriage 5 with respect to the base 1. Such means includes an indexible stop and selector valve means 32 similar to the means 31 previously described. This means 32 is supported by a frame 56 mounted on base 1 and comprises a shaft 57 similar to previously described shaft 34 positioned generally parallel to the Y direction of movement and carrying suitable adjustably located stops 58 similar to stops 37 previously described. Stops 58 are alternately contacted by an arm 59 projecting from the first carriage between these stops, and adapted to move the shaft 57 axially slightly as previously described. This shaft can be moved to six index positions by the cylinder C2-Y (FIGS. 1, 13b); the shaft carries a selector valve SV-2 similar to valve SV-1 previously described having six multiple ports.

Valves LV-4-1 through LV-4-6 (FIG. 13c) mounted on upwardly extending portion 61 of the base are selectively actuated as required by adjustable trip dogs 62 mounted in the slots of plate member 63 fixed to the second carriage 7 and overlying portion 61.

Figure 3:
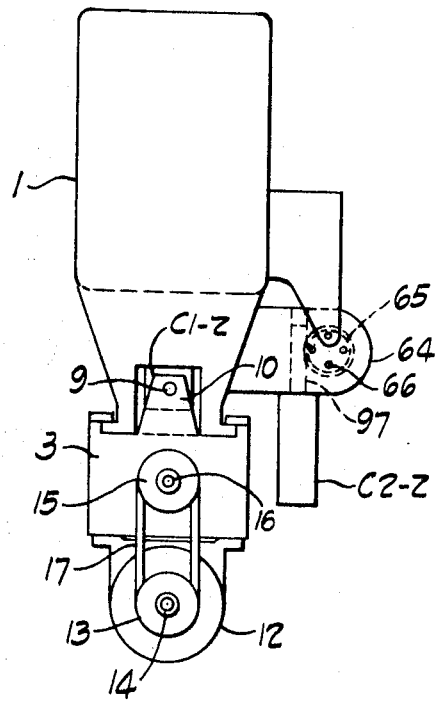
FIG. 3 is a plan of a portion of the machine of FIGS. 1 and 2 and to the same scale, from line 3-3 of FIG. 2.

The third carriage 3 that moves in the vertical or Z direction has on one side a frame portion 64 that rotatably supports a carrier 65 that carries at its lower end four adjustable stop screws 66 (FIGS. 2, 3) each of which when in a predetermined angular position relative to the axis of rotation of the carrier will abut a shoulder 67 on the base 1 of the machine when the carriage 3 is in a down position. This rotatable stop screw carrier 65 is indexed progressively into its four operative positions by a cylinder C2-Z (FIGS. 2, 3, 13b) having a rack on its piston rod driving a pinion connected through an overrunning one-way clutch to the carrier, in an arrangement similar to that described in connection with FIGS. 8 and 9, as will be described later.

A valve unit embodying a selector valve SV-3 (FIG. 13a) in the illustrated embodiment is suitably located, preferably within the control console C. The selector valve is similar to that described above in connection with FIGS. 6a, 6b, 6c, but has eight outlet ports each of which is adapted to be selectively connected to an inlet port connected to low-pressure air line 27, upon indexing of a shaft on which the movable part is mounted. Indexing is accomplished (FIG. 13c) by having a piston rod 71 carrying a rack 72 driving a pinion 73 connected to a cylinder C-3 through an overrunning or one-way clutch to turn and index the shaft 74 on which the movable part of the valve is mounted, which shaft is then held against rotation, by means and in a manner similar to those described above in connection with FIGS. 9 and 10. The piston rod 71, however, extends from both ends of the piston so that it can alternately operate limit valves LV-30 and LV-31 at alternate end positions of the piston rod. As the valve SV-3 is indexed, it puts air line 27 into communication with a selected one of air lines 81 to 88 inclusive (FIGS. 13a, 13b, 13c) connected to the multiple outlet ports of valve SV-3.

Figure 12:
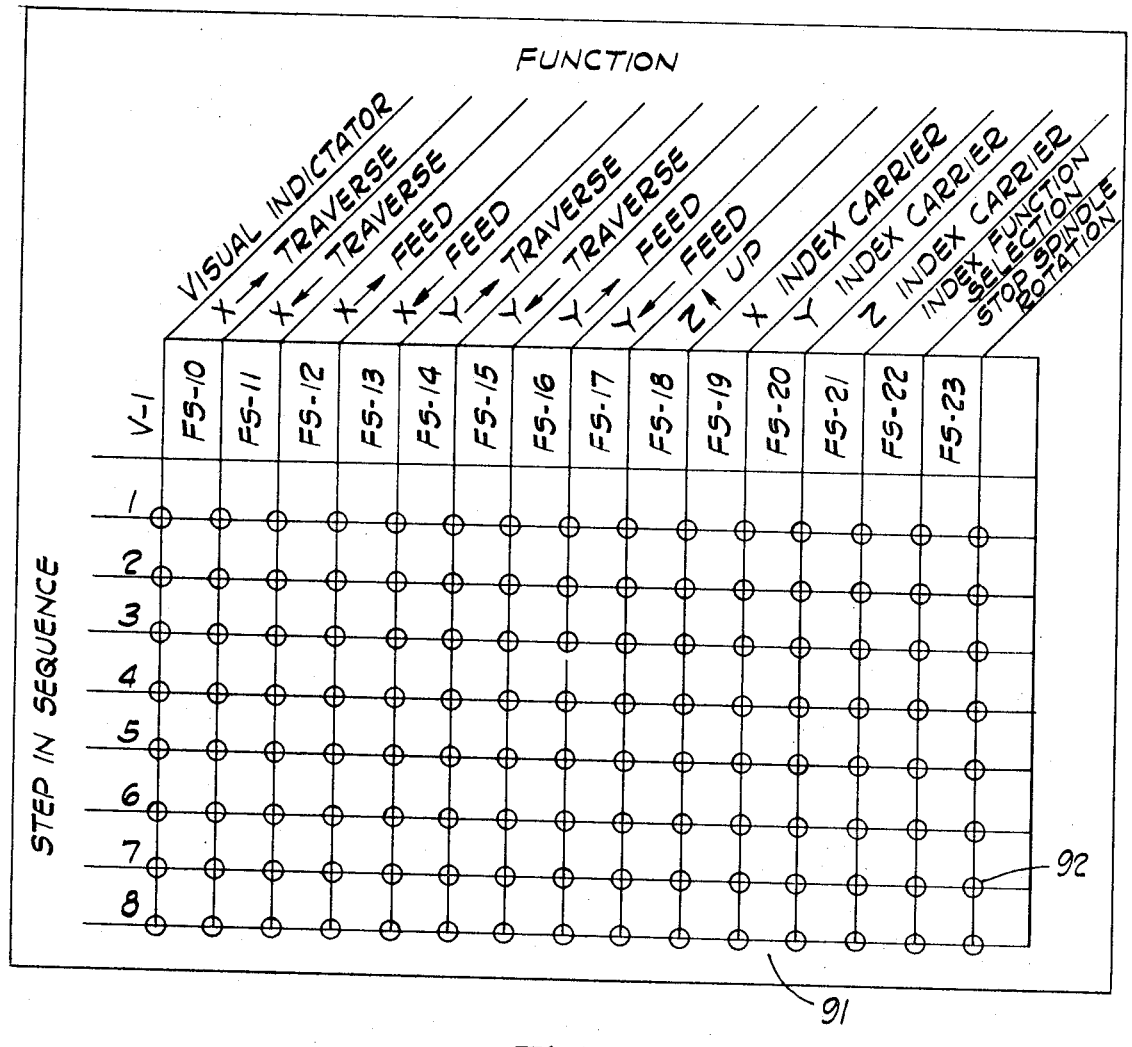
FIG. 12 diagrammatically shows the control panel of a console, containing machine setup and control elements.

The control console C has a working face 91, diagrammatically shown in FIG. 12, having projecting from it manually movable actuating elements 92 of machine function selector air valve switches each indicated by the prefix FS and numbers. These switches are conventional and of a push-pull type, that when in a pulled condition will permit the passage of air from one of lines 81 to 88 to make possible performance of the designated function. Therefore, when these valves are in pulled condition a function designated by the symbols and indicia on the working face of the console will be performed. The manually pullable portions of these valves advantageously are arranged on the console as shown in FIG. 12, in upright columns relating to the functions to be performed, and in horizontal rows indicating the sequence of steps to be performed in carrying out the functions.

Arrangement of Fluid System

In the fluid circuit diagrams of FIGS. 13a to 13c, conduits 28, shown only in part for clearness, connect the high-pressure air supply pipe 25 to the inlets of all pilot valve PV units. Conduits 27, also shown only in part for clearness, connect the low-pressure air from the pressure regulator 26 to the function selector switch SV-3 and thence through selected ones of lines 81 to 88 to other switches and the TA relays.

It is apparent from FIGS. 12, 13a and 13c that lines 81 to 88 inclusive connected to the outlet ports of the selector valve SV-3 are connected to the inlets of the function selector switches FS-22-1 to FS-22-8 inclusive on the console, and that when the actuating elements of any of these switches is lifted the switch communicates with the inlet of valve LV-30, which valve is normally open and in communication with a control port of fluid relay TA-1, the outlet of which communicates with the control port of a following fluid relay TA-2. The outlet of relay TA-2 communicates with both the inlet port of limit valve LV-31 that is normally open and communicates with a control port of relay TA-1, and also with the control port of a succeeding fluid relay TA-3. The outlet of relay TA-3 communicates with control port of following fluid relay TA-4, of which the outlet is connected to the control port of a fluid amplifier PV-1. The outlet of this amplifier when actuated by a signal from relay TA-4 passes high-pressure air to air-controlled directional hydraulic valve OV-1 that controls the flow of hydraulic liquid into the cylinder C-3 for indexing the function selector valve SV-3; the ends of the piston rod 71 of cylinder C-3 alternately actuate the normally open limit valves LV-30 and LV-31, to interrupt the fluid circuit through the valve. The series of fluid relays TA-1 to TA-4 establish and maintain a pneumatic signal that acts upon the control valve OV-1 to move the piston in cylinder C-3 to effect desired indexing of valve SV-3. Upon completion of piston movement to index, valve LV-31 is actuated to interrupt the fluid circuit that maintained such signal, and allow the hydraulic valve OV-1, which is spring biased for the purpose, to effect reset. The act of indexing selector valve SV-3 will interrupt any established path through SV-3 to allow reset as indicated. A new circuit path to establish index cannot be established until the cylinder C-3 has fully established reset.

The circuit by which signals are originated and passed through selector valve SV-1 to control index and reset movements of the piston of cylinder C-3 that controls valve SV-3, is shown in FIG. 13c. The six multiple ports on the stationary part of the valve are inlet ports that are separately connected to limit valves LV-3-1 to LV-3-6 respectively; each of these valves is of a commercially available type that generates an air pulse when its actuating element is pushed downwardly. The single port on the rotatable element of valve SV-1 acts as an outlet port that may be selectively connected to any one of the ports connected to valves LV-3-1 to LV-3-6, and that communicates with a line 93 in communication with the control port, connected to the outlet of limit valve LV-30, of the first fluid relay TA-1 of the series of fluid control units that control valve OV-1 of cylinder C-3. The selected ones of these pulse generating valves are actuated as indicated above by corresponding trip dogs 54 on the member 51 on the second carriage 7 carrying the worktable 4 for movement in the X direction.

Similarly, the selector valve SV-2 (FIG. 13c) associated with the first carriage 5 that moves in the Y direction has the multiple ports on its stationary member connected to pulse generating limit valves LV-4-1 to LV-4-6 inclusive, so that when the actuating member of any of these valves is depressed by contact of a trip dog 62 on member 63 mounted on the first carriage 5 that moves in the Y direction, an appropriate pulse is generated. The single selector port of the valve acts as an outlet port and also communicates with line 93.

The limit valves LV-1 and LV-2 (FIGS. 1, 2 and 13c) that are actuated by the axial motion of the shafts in the indexible stop and selector means 31 and 32 and thus are respectively actuated by motions along the X direction and the Y direction are of the pulse generator type and also connected by separate lines to the line 93. Furthermore, the manually pushbutton actuated pulse generator type valve LV-32 for starting the cycle is connected through electrically controlled limit valve LV-8 to the line 93.

Lines 81 to 88 are also respectively connected (FIG. 13a) to the inlets of switches FS-10-1 through FS-10-8 that control the movement of the worktable parallel to the X axis at a rapid traverse rate in one direction of movement; and respectively to switches FS-11-1 to FS-11-8 that control the movement of the worktable at a traverse rate in the opposite X direction.

Lines 81 to 88 are also respectively connected to the inlets of switches FS-12-1 to FS-12-8 that control movement of the worktable at feed rate parallel to the X axis in one direction of movement, and respectively to the inlets of switches FS-13-1 to FS-13-8 that control the movement of the worktable in the opposite X direction at feed rate.

When any of switches FS-10-1 to FS-10-8 is pulled at the console and the line 81 to 88 connected to it has been connected to the low-pressure air supply by switch SV-3, a signal is supplied to the control port of relay TA-5, the output port of which communicates with the control port of the fluid amplifier PV-2, the outlet port of which is connected to conduct high-pressure air to one side of a conventional air-operated spring-centered directional valve OV-2 that controls the direction of flow of hydraulic fluid to cylinder C1-X for moving the worktable 4 in one direction parallel to the X axis, through lines 19a and 20a that extend from valve OV-2 to cylinder C1-X through conventional variable restriction valves OV-3 to OV-4.

Similarly, when any of switches FS-11-1 to FS-11-8 is pulled at the console, it communicates with the control port of fluid relay TA-6, the output port of which provides a control signal for fluid amplifier PV-3, the high-pressure air output of which communicates with the other side of valve OV-2, and causes the hydraulic fluid to flow to cylinder C1-X to move the worktable 4 in the opposite direction parallel to the X axis.

As is also apparent from FIG. 13a, the outlet ports of the series of switches FS-10-1 to FS-10-8 corresponding to the down or inoperative positions of these switches are connected to the outlet ports of the series of switches FS-11-1 to FS-11-8 corresponding to the up or operative position of these switches; while the outlet ports of switches FS-11-1 to FS-11-8 corresponding to the down or inoperative positions of these switches are connected to the outlet ports of switches FS-10-1 to FS-10-8 corresponding to the up or operative positions of these switches, consequently, to cause movement of the piston of cylinder C1-X in a direction, one switch of each series of switches must be pulled up and the corresponding switch of the other series must be down.

Any of switches FS-12-1 to FS-12-8 that is pulled up at the console causes the corresponding line 81 to 88 to communicate with the control port of fluid relay TA-7, the output of which connects with the control port of fluid amplifier PV-4 connected to the variable restriction valve OV-3, while any switch FS-13-1 to FS-13-8 that is pulled up causes the corresponding line 81 to 88 to communicate with the control port of fluid relay TA-8 the output port which communicates with the control port fluid amplifier PV-5 the high-pressure air outlet of which communicates with variable restriction valve OV-4. Therefore, when such line 81 to 88 is filled with low-pressure air by switch SV-3, a control signal occurs.

Valves OV-3 and OV-4 control the speed of worktable 4 at the feed rate of travel in directions parallel to the X axis; the desired feed rate can be obtained by adjustment of flow regulator valve FV-X connected to valves OV-3 and OV-4.

The outlet ports of the series of switches FS-12-1 to FS-12-8 and of the series FS-13-1 to FS-13-8 are interconnected similarly to the outlet ports of the series of switches FS-10-1 to FS-10-8 and the series of switches FS-11-1 to FS-11-8 so that movement of the piston of cylinder C1-X can occur only when a switch of a series is pulled up and the corresponding switch of the other series is down.

The cylinder C1-Y is similarly connected and controlled to effect desired movements of the worktable in the Y directions by pulling up on the console selected ones of the function selector switches FS-14-1 to FS-14-8 inclusive, FS-15-1 to FS-15-8 inclusive, FS-16-1 to FS-16-8 inclusive and FS-17-1 to FS-17-8 inclusive. The portions of the circuit between these switches and cylinder C1-Y are designated for convenience by block 94 in FIG. 13a.

The lines 81 to 88 inclusive communicating with the outlet ports of the selector valve SV-3 (FIG. 13a) respectively communicate with the inlets of function selector pneumatic switches FS-19-1 to FS-19-8 inclusive that control the movements of the piston of cylinder C2-X that index the selector valve SV-1 and the stops on the means 31 associated with second carriage 7 that moves in the X direction. These switches are normally open in that they normally interrupt the circuit; the outlets of these switches communicate with the control port of fluid relay TA-11, the outlet port of which connects with the control port of fluid relay TA-12, the outlet port of which in turn provides a control signal to the fluid amplifier PV-6 that when thus activated transmits high-pressure air to the air-actuated hydraulic liquid control valve OV-5. Valve OV-5 controls the supply of hydraulic fluid to the cylinder C2-X that controls the indexing of the selector valve SV-1 and its associated stops 37. This valve is spring biased so as to control the hydraulic fluid to cause the piston of the cylinder to reset when the above air control signal is not in effect.

The cylinder C2-Y (FIGS. 1 and 13b) that indexes the selector valve SV-2 and its associated stops 58 on the means 32 for controlling movement of carriage 5 in the Y direction is connected through suitable valve means and fluid amplifier relay means to function selector switches FS-20-1 through FS-20-8 inclusive; such means is not described since it is similar to, and can be understood from, that associated with the cylinder C2-X. Therefore it is indicated by block 95 (FIG. 13b).

The rotatable carrier 65 on carriage 3 movable in the vertical Z direction is indexed as required to being the desired adjustable stop 66 into contact with projection 67 on the base 1, by hydraulic cylinder C2-Z. This cylinder C2-Z is controlled by presetting of function selector switches FS-21-1 through FS-21-8 on the console (FIG. 12) by fluid circuitry similar to that for controlling the operation of the cylinder C2-X of the second carriage 7 as described above, so such circuitry for cylinder C2-Z is shown by block 96. Motion of the piston of cylinder C2-Z is mechanically transmitted to the carrier 65 by a rack 97 on piston 98 meshing with pinion 99 acting through an overrunning clutch 100, between the pinion 99 and the carrier 65, in a manner similar to that previously described for other indexing means.

The means for controlling operation of the cylinder C1-Z for moving the carriage 3 and work holder spindle 2 up and down as required is illustrated on FIG. 13b. As shown, the outlet of any preset closed, normally open, function selector switch FS-18-1 through FS-18-2 can transmit a low-pressure signal from the activated line of lines 81 to 88, to the control port of a fluid relay TA-13 the output of which is connected to the control port of a following relay TA-14; the output of this relay is connected to the control port of fluid amplifier PV-7 the output port of which can transmit high-pressure air, when the amplifier is actuated, to an air-operated hydraulic control valve OV-6 that controls the flow of hydraulic fluid to the cylinder C1-Z as required to move the spindle. The valve OV-6 is spring biased so that when an air control signal is not present, the valve will cause the piston of cylinder C1-Z to move down. This circuitry is so designed that on the up or pulled position of an operational switch FS-18-1 to FS-18-8, the spindle will move up, whereas when the switch is down or pushed in the spindle will move down.

As shown in FIG. 13c the electric circuitry for starting and energizing the spindle motor 12 and pump motor 23 from powerlines 102 and 103 comprises a circuit between these lines and the motors embodying a "start motor" switch 104 and another circuit between the power lines and motor embodying a "stop motor" switch 105. Closing the switch 104 establishes a circuit through both motors and the electrically controlled pneumatic switch LV-8 (FIG. 13c). After the "start motor" switch is opened, the circuit is maintained through a circuit containing the "stop motor" switch 105 and a pneumatically actuated switch PS-1 when such switch is closed depending on the circuitry established through the various switches FS-23-1 through FS-23-8 on the console presetting control of spindle rotation.

The fluid actuated electrical switch PS-1 is connected to the outlet of fluid amplifier PV-8, the control port of which is connected to the outlet of fluid relay TA-15. The control port of this relay is connected to a line 106 which in turn is connected to the outlet ports of the function selector switches FS-23-1 to FS-23-8 to control spindle rotation. The inlet ports of these switches are respectively connected to lines 81 to 88 inclusive that are connected to the outlet ports of the selector valve SV-3.

Lines 81 to 88 are also preferably connected to suitable commercial pressure responsive indicator devices VI-1 to VI-8 (FIG. 13b) which indicate which of these several lines connected to the selector valve SV-3 contains an air signal. The arrangement pattern of the manually actuatable elements of the function selector switches on the console face 91 (FIG. 12) is such that a visual indication in an indicator V-1 to V-8 indicates a horizontal alignment of switch elements that are at that particular time operationally effective.

Operation

Consideration of the above-described circuitry indicates that a fluidic signal, pulse or continuous, may be present in line 93 under any of the following circumstances:

a. The electric circuit that actuates switch LV-8 is energized to close the switch to permit a fluidic signal to pass through it, and the start cycle button LV-32 is then manually depressed to generate a pulse-type fluidic signal.
b. The shaft 34 of the indexible stop and selector valve means 31 is moved axially to cause the fluidic pulse generator valve LV-1 to generate a pulse on movement of the second carriage 7 in the X direction.
c. The shaft 57 of the indexible stop and selector valve means 32 is moved axially to cause the fluidic pulse generator valve LV-2 to generate a pulse on movement of the first carriage 5 in the Y direction.
d. One of the intermediate position fluidic signal pulse generator valves LV-3-1 through LV-3-6 that are connected to the inlet port of selector valve SV-1, is operated by movement of the second carriage 7 in the X direction.
e. One of the intermediate position fluidic signal pulse generator valves LV-4-1 through LV-4-6 connected to the inlet port of selector valve SV-2 is operated by movement of the first carriage 5 in the Y direction.
f. A circuit is established through one path through selector valve SV-3 and a preset condition of appropriate function selector switches FS-22-1 through FS-22-8 and limit valve LV-30.

This fluidic signal acts upon the series of fluidic relays and the fluid amplifiers shown in FIG. 13c and described above that control hydraulic operating valve OV-1 to move the piston of cylinder C-3 to effect an index of valve SV-3. Upon completion of movement of the piston of C-3 to index, the limit valve LV-31 is actuated to interrupt the previously maintained circuit to allow the valve OV-1 to effect a reset position. The act of indexing selector valve SV-3 will interrupt any established path through SV-3 as outlined in "f" above and allow resetting as outlined. A new circuit path to establish an index position as in "f" above cannot be established until the piston of cylinder C-3 has fully established a reset position.

A typical control of movement in the X direction of the second carriage 7 carrying the worktable is apparent from the following. Assuming that the selector valve S-3 is indexed to allow a signal to be present in line 81 and no other lines, then this signal is present at the inlet ports of fluidic switches FS-10-1, FS-11-1, FS-12-1 and FS-13-1. Since these are push-pull devices they will maintain their positions once established. With all four down, neutral hydraulic circuitry is established so that there can be no movement of the piston of cylinder C1-X or the second carriage 7 in the X direction. With a pulled or up position of FS-10-1 but not of FS-11-1; or with a pulled or up position of FS-11-1 but not of FS-10-1, the directional valve OV-2 is actuated to cause movement of the piston of cylinder C1-X that causes the second carriage to move in an X direction.

Likewise, with both switches FS-12-1 and FS-13-1 in the pushed or down positions, return flow of hydraulic liquid from the cylinder C1-X is at an unrestricted rate permitting the traverse rate of movement of the worktable in the X direction. With a pulled or up position of FS-12-1 but not of FS-13-1 or with a pulled or up position of FS-13-1 but not of FS-12-1, return flow from the cylinder C1-X is through valve OV-3 or OV-4 at a restricted rate, as determined by the setting of the flow regulator valve FV-X to cause the worktable to move at a feed rate in the X direction. Similar control of movements in the X direction can be effected by other switches in the FS-10, FS-11, FS-12 and FS-13 series when the other lines 82 to 88 are energized by the switches SV-3.

Movements of the piston of cylinder C1-Y may be similarly controlled to control movement of the first carriage 5 and hence of the worktable 4 in the Y direction by suitable manipulation of function selector switches of the FS-14, series, FS-15 series, FS-16 series and FS-17 series.

Control of movement of the toolholding spindle 2 in the vertical or Z direction is apparent from consideration of FIG. 13b. Assuming the presence of a fluidic signal in line 81, but in no others, this signal is present at the inlet port to the fluidic switch FS-18-1. This push-pull device operates so that in the upper pulled position a pneumatic force is present in operating valve OV-7 to control the flow of hydraulic fluid into the cylinder C1-Z to effect movement of the spindle 2 upwardly; when the switch FS-18-1 is in the down position, the spindle will move down. The other switches FS-18-2 through FS-18-8 cause similar movements when the other lines 82-—88 are activated by switch SV-3.

Control from the console of the stop and selector valve means 31 for controlling movement in the X direction, may be understood as follows with reference to FIG. 13b. Assuming the presence of a fluidic signal in the line 81, but in no others, this signal is present at the inlet to fluidic switch FS-19-1. This is a push-pull device similar to those described above; when the handle is in the upper pulled position, pneumatic force is present at operating valve OV-5 to effect movement of the piston of cylinder C2-X to index. Reset is accomplished when the selector valve SV-3 is indexed to a new position and the corresponding switch FS-19-2 is in the down or pushed position.

Control from the console of indexing of the stop and selector means 32 for controlling movement of the worktable in the Y direction is similar, and requires no further discussion.

Similarly, control of the indexing of the carrier 65 for the stops 66 on carriage 3 for the spindle 2 is very similar, requiring proper positioning of one or more of the function selector switches FS-21-1 through FS-21-8.

Summarizing Discussion

In the above embodiment, to reduce the complexity and length of the discussion, eight control positions are provided by the selector valve SV-3 but any desired number of these positions within reason may be provided; probably a greater number up to 16 will usually be used.

Moreover, air has been discussed as the operating fluid for controlling the system but other types of fluids such as other gases may be used; air is the most readily available, lowest in cost and satisfactory when maintained at the proper status of cleanliness and supplied in proper quantity with reasonably accurate control or pressures.

Furthermore, there may be employed in the present invention fluid amplifiers and other fluid circuit components that are different from those disclosed above in the illustrative embodiment.

The invention may be applied to milling machines different from that disclosed, such as those in which the work holder is capable of being raised and lowered as desired and the toolholder is in a fixed vertical position, and in milling machines in which both the work holder and toolholder can be raised and lowered as required. The invention may also be applied to other types of machine tools.

From the above it will be evident that the present invention makes possible the manufacture and operation of machine tools, such as milling machines, that can be programmed and caused to operate in a wide variety of preselected programs. Such machines can be manufactured at reasonable costs, and their operation and maintenance are greatly simplified in comparison with prior machines with substantial savings in labor costs. The operations, which may be fully automatic are flexible in programming and operation, and can be made safe and substantially free of damage or breakdown by jamming or other carelessness in programming by an operator. Costs of construction and maintenance as compared with that of a fully electrically or hydraulically actuated machine may be considerably less, due to application of low-pressure fluidic signals as a means for controlling higher pressure fluidic signals, which in turn control the application of high hydraulic pressures to actuate mechanical mechanisms for moving the worktable and work holder.

Flexibility in operation is made possible by the provision of a central control console containing readily operable function selector switches for programming the machine, which not only select the tool position with respect to the work, but also cause proper relative movements between the tool and the work in preselected sequence.

Maintenance of trouble-free operation is made possible by ready access to the mechanical working mechanism, as well as to the selector and control panel and the fluidic relays, fluid amplifiers and other elements forming part of the circuitry.

It is apparent that modifications other than those indicated above may be made in the illustrative embodiment of the invention, and that the invention may be used for purposes other than the purpose indicated in the illustrative embodiment without departing from the spirit of the invention. It is intended that the patent shall cover, by suitable expression in the appended claims, the features of patentable novelty that reside in the invention.

We claim:

1. In a machine tool, a rotatable toolholder, a work holder, said holders being relatively movable to perform a work operation on a workpiece in the work holder, means for relatively moving one of said holders through a preselected cycle of operations with respect to said other holder, said means including a pneumatic fluidic system comprising a source of low pneumatic fluid pressure, a source of substantially higher pneumatic fluid pressure, fluid amplifier means connected to said relatively higher pressure source and responsive to preselected fluidic signals from said low-pressure source for controlling higher pressure pneumatic output from said fluid amplifier, indexible selector valve means connected with said low-pressure source for sequential programmed distribution of a low-pressure fluidic signal to said fluidic system to effect selective work cycles, and means for indexing said selector valve means in response to movement of one of said holders.

2. The apparatus of claim 1 which comprises a plurality of fluid amplifiers connected to said relatively high-pressure source and responsive to preselected fluidic signals from said low-pressure source for controlling a high-pressure fluid output, and in which said indexible selector valve means connected with said low-pressure source is adapted to be connected to selected ones of said fluid amplifiers for sequential programmed distribution of low-pressure fluidic signals to said fluid amplifiers to effect a selected work cycle.

3. The apparatus of claim 1 comprising means for moving one of said holders relatively to the other holder to a preselected position with respect to said other holder, and means for indexing said selector valve means when such holder moves to said preselected position.

4. The apparatus of claim 1 in which at least one of said holders is mounted for forward and return movements relative to the other holder, in which there is a power source for moving said holder in said movements thereof, and in which the high-pressure pneumatic output of said fluid amplifier means controls said power source.

5. The apparatus of claim 4 in which said power source is fluid power means.

6. The apparatus of claim 4 in which said power source is hydraulic cylinder means.

7. The apparatus of claim 1 in which said source of substantially low pneumatic fluid pressure provides fluid pressure on the order of 1 p.s.i. or less.

8. The apparatus of claim 1 in which said source of substantially higher pneumatic fluid pressure provides fluid pressure between about 60 p.s.i. and about 150 p.s.i.

9. The apparatus of claim 1 in which said source of substantially low pneumatic fluid pressure provides fluid pressure on the order of 1 p.s.i. or less and said source of substantially higher pneumatic pressure provides pneumatic fluid pressure between about 60 p.s.i. to about 150 p.s.i.

10. The apparatus of claim 1 wherein said indexible selector valve means comprises an indexible selector valve and a plurality of programmable series of fluid distribution control means, different series of said plurality of series being connected to said source of low pneumatic fluid pressure in accordance with the indexed position of said selector valve whereby low-pressure fluidic signals indicative of desired functions to be performed by said holders may be distributed to said fluidic system to effect selective work cycles.